US000001213H

United States Statutory Invention Registration [19]

[11] Reg. Number: H1213

Hwo

[43] Published: Jul. 6, 1993

[54] POLYPROPYLENE-POLYBUTYLENE SHRINK FILM COMPOSITIONS

[75] Inventor: Charles C. Hwo, Sugar Land, Tex.

[73] Assignee: Shell Oil Company, Houston, Tex.

[21] Appl. No.: 659,814

[22] Filed: Feb. 25, 1991

Related U.S. Application Data

[63] Continuation-in-part of Ser. No. 524,624, May 17, 1990.

[51] Int. Cl.[5] ..... C08L 23/00

[52] U.S. Cl. ..... 525/240; 524/490

[58] Field of Search ..... 525/240; 524/490, 491

[56] References Cited

U.S. PATENT DOCUMENTS

| | | | |
|---|---|---|---|
| 3,634,552 | 1/1972 | Foglia et al. | 260/897 A |
| 3,634,553 | 1/1972 | Foglia et al. | 260/897 A |
| 3,754,063 | 8/1973 | Schirmer | 264/22 |
| 3,849,520 | 11/1974 | Bullard et al. | 260/897 |
| 3,891,008 | 6/1975 | D'Entremont | 138/146 |
| 3,900,534 | 8/1975 | Schard | 260/897 |
| 3,932,274 | 1/1976 | Izumi et al. | 210/44 |
| 4,194,039 | 3/1980 | Mueller | 428/213 |
| 4,196,240 | 4/1980 | Lustig et al. | 428/35 |
| 4,207,363 | 1/1980 | Lustig et al. | 428/35 |
| 4,379,888 | 4/1983 | Yoshimura et al. | 525/211 |
| 4,670,529 | 6/1987 | Kitamura et al. | 526/348 |

FOREIGN PATENT DOCUMENTS 1570353 4/1991 Fed. Rep. of Germany .

*Primary Examiner*—Robert L. Stoll
*Assistant Examiner*—Joseph D. Anthony

[57] ABSTRACT

A composition comprising a blend of from about 10% by weight to about 90% by weight of a propylene polymer from about 10% by weight to about 90% by weight of low melt index polybutylene having a melt index of between about 0.5 and 10 and about 0.5% by weight to about 10% by weight of a high melt index polybutylene having a melt index of from about 10 to about 1000 including articles prepared therefrom.

22 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

POLYPROPYLENE-POLYBUTYLENE SHRINK FILM COMPOSITIONS

REFERENCE TO PRIOR APPLICATION

This application is a continuation-in-part of my application entitled "Polypropylene-Polybutylene Shrink Film Compositions", Ser. No. 524,624, filed May 17, 1990, which is presently copending herewith.

BACKGROUND OF THE INVENTION

The present invention relates to films made from blends of thermoplastic polymer materials which have improved properties. More particularly, the present invention relates to films made from blends of a propylene polymer, a butylene polymer with a low melt index and a butylene polymer with a high melt index which are heat shrinkable and which have good clarity and good processability.

Thermoplastic blends for films are used as packaging material, and in the area of shrink packaging, for objects that are packaged in thermoplastic shrink film. Shrink film is used in many applications, for example, for many types of packaging and wrapping articles such as toys, sporting goods, stationary, greeting cards, hardware, household products, office supplies and forms, phonograph records, industrial parts, computer floppy diskettes, and photo albums, etc. Heat is applied to the film and the film shrinks to conform to the shape of the article packaged therein.

Many thermoplastic films shrink to some extent if they are subjected to elevated temperatures. Use is made of this characteristic by subjecting objects packaged in such films for a short time to elevated temperatures, e.g. exposing them to a blast of heated air, or by immersing in boiling water so that the film shrinks, thereby tightly enclosing the objects packaged therein. Examples are films fabricated from polyolefins or irradiated polyolefins.

Usually for most shrink film applications, a film should exhibit a high shrink energy or contractile force when exposed to elevated temperatures. In addition, the film should not only be heat shrinkable but have good clarity and be easily processed.

A shrink film should possess the following specific properties:

(1) the shrink force should be between 100 and 400 grams per inch at 100° C. depending on the objects to be encased.

(2) the percent shrinkage should be between 10 and 50% at 121° C. depending on the objects to be encased.

(3) the film should have high clarity.

(4) the modulus should be between 60,000 and 350,000 psi depending upon the objects to been encased.

(5) machinability: the coefficient of friction should be less than 0.5.

(6) tear strength: the tear strength should be as high as possible; typical is 3 to 15 grams per mil of film thickness and per inch of width.

(7) elongation: the elongation should be between 50 and 150% depending on the objects to be encased.

Films may be oriented or unoriented. Oriented films may be obtained by stretching processes in which tensions capable of stretching the film are applied to the film, the directions of which form an angle of about 90° utilizing well known prior art techniques. These film stretching tensions may be applied sequentially, as in the case of the film, after forming, is subjected to stretching in a longitudinal direction and thereafter tension is applied in a transverse direction to stretch the film transversely, or simultaneously, whereby longitudinal and transverse tensions are applied to the film at the same time resulting in a simultaneous longitudinal and transverse stretching of the film.

U.S. Pat. No. 3,900,534 discloses a biaxially oriented thermoplastic film structure formed from a blend comprising polypropylene and polybutene homopolymers where the polybutene is present in a small amount of more than 10% but less than 20% by weight.

U.S. Pat. No. 3,634,553 discloses a heat shrinkable oriented thermoplastic film which comprises a blend of polypropylene and an ethylene/butene-1 copolymer.

European Patent Applications 145,014A discloses a blend of a random copolymer of propylene and an alpha olefin with 4 or more carbon atoms (i.e. perhaps butene-1), where the alpha olefin content in the copolymer is 8 to 30 mole % (m %).

Single layer shrink films based on blends of polybutylene with polypropylene are disclosed in Mobil Patents: U.S. Pat. No. 3,634,552 (1972), U.S. Pat. No. 3,364,553 (1972), U.S. Pat. No. 3,849,520 (1974) and U.S. Pat. No. 3,900,534 (1975) and blends of polybutylene with ethylene vinyl acetate (EVA) and $C_2$–$C_\alpha$ elastomer or polybutylene with low density polyethylene (LDPE) and $C_2$–$C_\alpha$ elastomer (where $C_\alpha$ is an $\alpha$-olefin comonomer) are disclosed in U.S. Pat. No. 4,379,888 (1983). Multilayers may include three layers (propylene-ethylene plus butene-1-ethylene plus ethylene-propylene rubber)/tie layer/linear low density polyethylene (LLDPE) by Union Carbide, U.S. Pat. No. 4,196,240 (1980) for frozen poultry and U.S. Pat. No. 4,207,363 (1980) for primal meat cuts. Three layers of propylene-ethylene/(EVA+butene-1-ethylene)/propylene-ethylene, U.S. Pat. No. 4,194,039 (1980) is known. Also three layers (polyproylene+-polybutylene)/EVA/irradiated EVA by Cryovac, U.S. Pat. No. 3,754,063 (1973), U.S. Pat. No. 3,932,274 (1974), and U.S. Pat. No. 3891,008 (1975) for turkey bags are known.

Polyvinyl chloride (PVC) has been used to produce good shrink films. PVC has been shown to be better in certain applications than the use of polyolefins such as propylene polymers. The use of polyolefins in shrink wrap results in a moderate to high shrink force which is undesirable in many applications. However, the use of polyolefins allows the use of high speed automated packaging machinery with lower cost, and less corrosion of equipment. PVC, however, may produce a better looking package because of the low shrink force and better optics. Also, the seal and shrink of PVC films may take place over a much broader temperature range and tear strength may be better.

There has been a need for a blend of heat shrinkable thermoplastic film with the film advantages of PVC but which is of low cost, can be used on a high speed automated packaging machine and which does not corrode equipment. The polybutylene polypropylene polymer blend film of the present invention exhibits low shrink force which is adjustable by the blending ratio, low shrink temperature, low stiffness, better optics, low corrosion, low cost, and can be used on high speed automated packaging machines.

It has been found that properties can be improved and processing difficulty can be alleviated by adding a small amount (less than 10 w%) of high melt flow or low molecular weight polybutylene as a third component to the PP-BB blends. The new film composition may reduce the scraps generated at the stretching operation during the fabrication of biaxially oriented low shrink force shrink films.

Improvement of the processing characteristics in the fabrication of plastic products has long been demanded due to economical reasons. Optical and shrink properties are considered as critical as the processing characteristics especially in the shrink film packaging industry. Frequently, additives used to improved processability have detrimental effects on physical and optical properties of the products. The addition of high melt index polybutylene into the polypropylenepolybutylene blend of this invention unexpectedly improves both processability and properties.

SUMMARY OF THE INVENTION

Applicant has discovered that polypropylene, low melt flow polybutylene and high melt flow polybutylene may be blended producing a heat shrinkable oriented thermoplastic film having good clarity and good processability.

The blend can be formed into a packaging film, sheet, or laminar structure which is shrinkable and has good clarity and good processability.

The blend comprises from about 10% by weight to about 90% by weight preferably 30% to 70% and more preferably 40% to 60% of a polypropylene homopolymer or copolymer, from about 10% by weight to about 90% by weight preferably 30% to 70% and more preferably 40% to 60% of a low melt index polybutylene homopolymer or copolymer and from 0.5% by weight to about 10% by weight preferably 2% to 8% and more preferably 4% to 6% of a high melt index polybutylene homopolymer or copolymer.

DETAILED DESCRIPTION OF THE INVENTION

The high melt index poly-1-butene referred to herein is a butene-1-polymer containing at least about 90%, preferably at least about 95%, ad more preferably about 97%, by weight of isotactic portions. Useful in the present invention are isotactic poly-1-butenes having a low molecular weight, e.g. less than about 280,000 as determined by solution viscosity in "Decalin" (decahydronaphthalene). Usable poly-1-butenes have a density of 0.900–0.925, preferably 0.905–0.920 and especially 0.910–0.915. Usable poly-1-butenes have melt indices in the range of from 10 to 350, more preferably 20–300, and most preferably 100–200, as determined by ASTM D-1238 Condition E, at 190° C. The intrinsic viscosity of the polybutylene may range from about 0.03 to about 0.20 preferably from about .06 to about 0.11 at 130° C. The Brookfield melt viscosity is greater than 20,000 CPS at 200° C., preferably greater than 25,000 CPS at 200° C., most preferably greater than 35,000 CPS at 200° C.

The low melt index butene-1 polymers referred to herein are substantially polybutene-1 containing at least 95%, preferably 97%, and most preferably 98% by weight of isotactic portions. Suitable polybutenes have a density of 0.914–0.919 and a melt index of less than 20 g/10 min. at 190° C.

Suitable polybutenes can be obtained, for example, according to Ziegler-Natta low pressure polymerization of butene-1 as disclosed in German Published Application No. 1,570,353.

The butene-1 polymers (PB) usable herein are either butene-1 homopolymers or copolymers. If butene-1 copolymers are used, the non-butene comonomer content is preferably 1–30 mole % of either ethylene, propylene, or an alpha olefin having from 5 to 8 carbon atoms.

Suitable poly-1-butenes can be obtained, for example, in accordance with Ziegler-Natta low-pressure polymerization of butene-1, e.g. by polymerizing butene-1 with catalysts of $TiCl_3$ or $TiCl_3 \cdot AlCl_3$ and $Al(C_2H_5)_2Cl$ at temperatures of 10°–50° C., preferably 20°–40° C., e.g. according to the process of German Published Application No. 1,570,353. High melt indices are then obtained by further processing the polymer by peroxide cracking. The polybutylene may be modified to increase surface activity by reaction with, for example, maleic anhydride or other functional group.

Duraflex® PB8240 is a particularly suitable low melt index polybutylene having a melt index of 2.0 g/10 min. at 190° C. which is useful in the present blends and is available from Shell Chemical Company.

Duraflex® DP0800, a developmental poly-1- butene polymer produced by Shell Chemical Company, of Houston, Tex. is a particularly suitable high melt index butene-1 polymer for use in the novel blend. This novel polymer is a homopolymer with a melt index of 200 and a molecular weight of 108,000.

Duraflex® PB0400, a commerically available poly-1-butene polymer produced by Shell Chemical Company, is another high melt index polymer suitable for use in this invention. The polymer is a homopolymer with a melt index of 20 g/10 min. at 190° C. and 45 g/10 min. at 210° C. and a molecular weight of 202,000.

The polypropylene used in the present invention is any crystallizable polypropylene. Said polypropylene can be prepared by homopolymerizing propylene irrespective of the method used so long as crystallizable polypropylene is formed. The preferred polypropylenes are the substantially isotactic polypropylenes prepared by the Ziegler/Natta or $MgCl_2$-supported catalyst polymerization process.

The propylene polymers usable herein can be either propylene homopolymers or copolymers. If propylene copolymers are used, they can be random or block copolymers with the comomoner content preferably 1–30 mole % of either ethylene, butene, or an alpha olefin having from 5 to 8 carbon atoms.

Propylene polymers useful in the invention preferably have a melt index of less than 60, more preferably from about 1–15, as measured by ASTM D-1238, Condition L at 230° C. A particularly suitable propylene, has a melt index of 3.2 and is available from Shell Chemical Company, of Houston, Tex. as PP5CO8.

A preferred blend contains 5% by weight of a high melt index butene-1-homopolymer having a melt index of about 200 g/10 min., 47.5% by weight of a propylene homopolymer having a melt index of about 3.2 and 47.5% by weight of a low melt index butene-1 homopolymer having a melt index of less than 10.

The blends may also contain additives and fillers, e.g. mold release agents, UV or thermal stabilizers, slip agents, antiblock agents, nucleating agents, pigments, antioxidants, or flame retardants.

Blending of the components can occur by one of several methods, such as, dry tumble blending, masterbatch, or melt compounding techniques. The method of combining the ingredients of the formulation is important. For example, in most cases, it is desirable to use the least amount of energy to merge the components into an effective blend. Therefore, the preferred method of blending is dry blending the components in a powder form.

The polymer and copolymer components of the film composition of the present invention are blended together to form a substantially homogeneous resin mixture. This may be accomplished, for example, by tumbling the mixture in a fiber drum. The tumble mixture is then melt compounded by an extruder having good mixing and pelletized thereafter. The blend is then extruded into a film utilizing a standard extruder and tubular on flat film die and is subsequently oriented utilizing any one of a number of prior art film orientation techniques.

Various thicknesses of shrink film may be manufactured through utilizing a novel resin composition of the present invention. The thickness may generally vary from about 0.10 mil to about 5 mils and preferably from about 0.5 mil to about 2.0 mils.

The following examples as set forth to more clearly illustrate the present invention are not intended to limit the scope thereof.

EXAMPLES

Blends were prepared from PP5C08, a polypropylene homopolymer having a melt index of 3.2, available from Shell Chemical Co. of Houston, Tex., Duraflex® PB8240 polybutylene, Duraflex® DP0800 polybutylene, and Duraflex® PB0400 polybutylene.

The typical physical properties of the high melt index polybutylene (DP0800) are listed below.

TABLE 1

| | Typical Physical Properties of DP0800 Polybutylene | | | |
|---|---|---|---|---|
| | ASTM | Unit | | Polybutylene |
| | Test Method | English | (Metric) | DP0800 |
| Melt Index | | | | |
| @ 190° C. | D1238 "E" | — | g/10 min | 200 |
| @ 210° C. | D1238 "L" | — | g/10 min | 490 |
| Density | D1505 | lb/ft | g/cm$^3$ | 57.1 (0.915) |
| Tensile strength @ yield | D638 | psi | MPa | 2000 (13.8) |
| Tensile strength @ break | D638 | psi | MPa | 4200 (29.0) |
| Elongation at break | D638 | % | % | 350 |
| Modulus of elasticity | D638 | psi | MPa | 35000 (241) |
| Hardness, Shore | D2240 | D scale | D scale | 55 (55) |
| Brittleness temperature | D746 | °F. | °C. | 0° (18°) |
| Melting point range | DSC | °F. | °C. | 255–259° (124–126°) |
| Soft point, Vicat | D1525 | °F. | °C. | 241° (116°) |
| Thermal conductivity, at 77° F. | C177 | Btu/ft$^2$/hr/°F./in | Kcal/m$^2$ hr/°C./cm | 1.25 (16) |

Formulations 1–6 were prepared in the proportions given in Table II for testing.

TABLE II

| Formulation | WRS6151 PP | PP5C08 | PB8240 | DP0800 | PB0400 |
|---|---|---|---|---|---|
| 1 | 100 | | | | |
| 2 | 95 | | | 5 | |
| 3 | | 100 | | | |
| 4 | | 95 | | | 5 |
| 5 | | 50 | 50 | | |
| 6 | | 47.5 | 47.5 | 5 | |

The formulations were prepared by drying tumbling the ingredients for about 1 control hour in a drum at room temperature. The dry tumbled blend was placed in a 1¼" single stage screw Brabender extruder, with the screw equipped with a mixing head. The compounding was run at a temperature between 420° F. and 450° F. and the mixture was given a residence time of about 5 control minutes in the extruder. The mixture was extruded into a strand, cooled and chopped into pellets using conventional techniques. Sheets were then prepared by the casting process using a sheet processing line using a Killion extruder.

It can be seen from the data in Table IV that significant improvements in clarity or gloss can be obtained by blending a high melt flow polybutylene to specific polypropylene products. Sample 2 shows an almost 10% improvement in clarity which is accompanied by a decrease in gloss when 5% of high melt flow polybutylene DP 0800 is used. Sample 4, in a different polypropylene, shows an increase in gloss of almost 40% when 5% of the high melt flow polybutylene PB 0400 is added to another polypropylene. This increase in gloss is accompanied by a substantial decrease in clarity. Sample 6 using a blend of the two previously used polypropylenes shows that incorporation of 5% of the DP 0800 high melt flow polybutylene gives an increase in clarity of over 20% with essentially no compromise in gloss. In summary, it is shown that the addition of small amounts of high melt flow polybutylene can affect the optical properties of polypropylene films, especially clarity and gloss so that optical properties can be tailored for specific end uses. Sheet samples were drain using the conditions given in Table III below. The stretching conditions on the sheet were, Draw Speed—30 mm/sec, preheat time—3 minutes, and grip force—125–150 psi.

TABLE III

| SAMPLE # | Stretching Conditions: THICKNESS (MILS) BEFORE | AFTER | DWELL (SEC) | TEMP (DEG F.) | DRAW RATIO |
|---|---|---|---|---|---|
| 1 | 21 | 1.0 | 60 | 255 | 4.5:1 |
| 2 | 21 | 1.2 | 60 | 245 | 4.5:1 |
| 3 | 7 | 0.8 | 45 | 298 | 3:1 |
| 4 | 7 | 0.8 | 45 | 290 | 3:1 |
| 5 | 7 | 1.0 | 30 | 250 | 3:1 |
| 6 | 7 | 1.0 | 30 | 240 | 3:1 |

Table IV shows the results of the stretching of the formulations on the T. M. Long Stretcher.

TABLE IV

| SAMPLE # | Optical Properties of Films HAZE | CLARITY | GLOSS |
|---|---|---|---|
| 1 | 1.9 | 64 | 118 |
| 2 | 1.9 | 70* | 111 |
| 3 | 10.9 | 11.9 | 56.2 |
| 4 | 14.8 | 3.4 | 78.8* |
| 5 | 12.4 | 15 | 52.8 |
| 6 | 16.5 | 18.8* | 52.7 |

*Improved

As can be seen from Table IV formulation 6, containing polypropylene, low melt index polybutylene and 5% by weight high melt index polybutylene had a significant improvement in haze and clarity over the blends not containing the high melt index polybutylene.

The high melt index butene-1 polymer flows better than the low melt index material creating a film or article with good optical properties. The high melt flow material flows better to the surface of the film creating a higher value of glass than a low melt index polybutylene. In the bulk of the film during stretching, the high melt index material fills the microvoids better than low melt index polybutylene with improved gloss and reduction of microvoids. The clarity and haze of the blends containing the high melt index material is improved when compared with those containing only the low melt flow polybutylene material.

In terms of processability, the high melt flow material usually acts as a better lubricant than a low melt flow polybutylene and consequently improves the processability of the material into film, thus reducing film breakage when compared with low melt flow polybutylene material.

The examples above are intended only for the purposes of being illustrative of the invention. It is not intended that the invention be limited in scope to the Examples.

It is also contemplated that the present invention includes laminar structures, wherein the novel blend is disposed on a substrate, such as nylon or polyester or polycarbonate with or without an additional tie layer adhesive forming a laminate or laminar structure.

What is claimed is:

1. A composition comprising a blend of from about 10% by weight to about 90% by weight of a propylene polymer from about 10% by weight to about 90% by weight of a low melt index polybutene-1 having a melt index of between about 0.5 and 10 and about 0.5% by weight to about 10% by weight of a high melt index polybutene-1 having a melt index of from about 20 to about 350 g/10 minutes and a melt viscosity of greater than 20,000 CPS at 200° C.

2. The composition of claim 1 wherein the polypropylene is present at from about 30% by weight to about 70% by weight.

3. The composition of claim 1 wherein the polypropylene is present at from about 40% by weight to about 60% by weight.

4. The composition of claim 1 wherein the low melt index polybutene-1 is present at from about 30% by weight to about 70% by weight.

5. The composition of claim 1 wherein the low melt index polybutene-1 is present at from about 40% by weight to about 60% by weight.

6. The composition of claim 1 wherein the high melt index polybutene-1 is present at from about 2% by weight to about 8% by weight.

7. The composition of claim 1 wherein the high melt index polybutene-1 is present at from about 4% by weight to about 6% by weight.

8. The composition of claim 1, wherein said high melt index polybutene-1 has a melt index in the range of about 20 to about 300.

9. The composition of claim 1, wherein said high melt index polybutene-1 has a melt index in the range of about 100 to about 200.

10. The composition of claim 1, wherein said polybutene-1 is selected from the group comprising: butene-1 homopolymers, and butene-1 copolymers having 1–30 mole % of an alpha olefin having from 2–8 carbon atoms.

11. The composition of claim 1, wherein said propylene polymer is a member of the group comprising: propylene homopolymers, and propylene copolymers having 1–30 mole % of an alpha olefin having from 2–8 carbon atoms.

12. A molded article prepared from the composition of claim 1.

13. The molded article of claim 12, wherein said high melt index polybutene-1 has a melt index in the range of 20 to about 650.

14. The molded article of claim 12, wherein said high melt index polybutene-1 has a melt index in the range of about 100 to about 500.

15. The molded article of claim 12, wherein said high melt index polybutene-1 is selected from the group comprising: butene-1 homopolymers, and butene-1 copolymers having 1–30 mole % of an alpha olefin having from 2–8 carbon atoms.

16. The molded article of claim 12, wherein said propylene polymer is a member of the group comprising: propylene homopolymers, and propylene copolymers having 1–30 mole % of an alpha olefin having from 2–8 carbon atoms.

17. The molded article of claim 12 comprising 85% by weight of said propylene polymer and 5% by weight of said high melt index polybutylene-1 polymer.

18. A film or sheet prepared from a blend comprising from about 10% by weight to about 90% by weight of a propylene polymer from about 10% by weight to about 90% by weight of low melt index polybutene-1 having a melt index of between about 0.5 and 10 and about 0.5% by weight to about 10% by weight of a high melt index polybutene-1 having a melt index of from about 10 to about 350 g/10 minutes.

19. The film or sheet of claim 18, wherein said high melt index polybutene-1 has a melt index in the range of about 20 to about 30 g/10 minutes.

20. The film or sheet of claim 18, wherein said high melt index polybutene-1 has a melt index in the range of about 100 to about 200.

21. The film or sheet of claim 20, wherein said polybutene-1 is selected from the group consisting of: butene-1 homopolymers and butene-1 copolymers having 1–30 mole % of an alpha olefin having from 2–8 carbon atoms.

22. The film or sheet of claim 20, wherein said propylene polymer is selected from the group consisting of: propylene homopolymers and propylene copolymers having 1–30 mole % of an alpha olefin having from 2–8 carbon atoms.

* * * * *